United States Patent
Zhang et al.

(10) Patent No.: US 12,205,147 B2
(45) Date of Patent: Jan. 21, 2025

(54) FEATURE PROCESSING METHOD AND APPARATUS FOR ARTIFICIAL INTELLIGENCE RECOMMENDATION MODEL, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Yafei Zhang, Shenzhen (CN); Junwei Zhong, Shenzhen (CN); Feng Xia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 484 days.

(21) Appl. No.: 17/491,435

(22) Filed: Sep. 30, 2021

(65) Prior Publication Data

US 2022/0020064 A1    Jan. 20, 2022

Related U.S. Application Data

(63) Continuation of application No. PCT/CN2020/103256, filed on Jul. 21, 2020.

(30) Foreign Application Priority Data

Aug. 29, 2019   (CN) .......................... 201910810105.6

(51) Int. Cl.
    *G06N 20/00*    (2019.01)
    *G06F 18/214*   (2023.01)
    *G06Q 30/0251*  (2023.01)

(52) U.S. Cl.
    CPC ..... *G06Q 30/0269* (2013.01); *G06F 18/2148* (2023.01); *G06N 20/00* (2019.01)

(58) Field of Classification Search
    CPC ................ G06Q 30/0269; G06N 20/00; G06F 18/2148
    See application file for complete search history.

(56) References Cited

U.S. PATENT DOCUMENTS

2017/0357760 A1    12/2017  Han et al.
2018/0189615 A1*    7/2018  Kang ...................... G06N 3/08
(Continued)

FOREIGN PATENT DOCUMENTS

CN    105589971 A    5/2016
CN    106056427 A    10/2016
(Continued)

OTHER PUBLICATIONS

The World Intellectual Property Organization (WIPO) International Search Report for PCT/CN2020/103256 Oct. 28, 2020 7 Pages (including translation).

(Continued)

*Primary Examiner* — Casey R. Garner
(74) *Attorney, Agent, or Firm* — ANOVA LAW GROUP PLLC

(57) ABSTRACT

This application provides a feature processing method and apparatus for an artificial intelligence (AI) recommendation model, an electronic device, and a storage medium. The method includes obtaining input data, and converting a data structure of the input data into a uniform sample structure; determining a feature group identifier and a feature extraction function that correspond to the AI recommendation model; extracting a feature group identifier, a feature identifier and a feature value of the input data from the converted input data according to the feature extraction function; and constructing a sample of the AI recommendation model according to the feature group identifier, the feature identifier and the feature value of the input data.

20 Claims, 9 Drawing Sheets

(56) References Cited

U.S. PATENT DOCUMENTS

2019/0138806 A1\* 5/2019 Banerjee ........... G06F 16/24568
2020/0272913 A1\* 8/2020 Yu ............................ G06N 7/01
2021/0097159 A1 4/2021 Wang et al.

FOREIGN PATENT DOCUMENTS

| | | | |
|---|---|---|---|
| CN | 107292298 | A | 10/2017 |
| CN | 108879692 | A | 11/2018 |
| CN | 109086312 | A | 12/2018 |
| CN | 109635993 | A | 4/2019 |
| CN | 110516815 | A | 11/2019 |
| JP | H08212181 | A | 8/1996 |
| JP | 2017211690 | A | 11/2017 |
| JP | 2019029003 | A | 2/2019 |
| JP | 2019057016 | A | 4/2019 |
| WO | 2019019256 | A1 | 1/2019 |
| WO | 2019043163 | A1 | 3/2019 |

OTHER PUBLICATIONS

Xianping Tao et al., "(Non-official translation) Software Service Multimodal Middleware Model and Supporting Technology Thereof," Science in China (Series E: information Sciences), vol. 38, No. 4, Apr. 30, 2008 (Apr. 30, 2008), pp. 504-516. 16 pages.
The Japan Patent Office (JPO) Decision to Grant a Patent for Application No. 2021-561988 and Translation Dec. 5, 2022 5 Pages.
Search Report by Registered Search Organization Mirai Intellectual Property Technology Research Center, Inc. Japanese Patent Application No. 2021-561988 Oct. 26, 2022 39 Pages.

\* cited by examiner

FEATURE PROCESSING METHOD AND APPARATUS FOR ARTIFICIAL INTELLIGENCE RECOMMENDATION MODEL, ELECTRONIC DEVICE, AND STORAGE MEDIUM

RELATED APPLICATIONS

This application is a continuation application PCT Application No. PCT/CN2020/103256, entitled "FEATURE PROCESSING METHOD AND APPARATUS FOR ARTIFICIAL INTELLIGENCE RECOMMENDATION MODEL, ELECTRONIC DEVICE, AND STORAGE MEDIUM" and filed on Jul. 21, 2020, which claims priority to Chinese Patent Application No. 201910810105.6, entitled "FEATURE PROCESSING METHOD AND APPARATUS FOR ARTIFICIAL INTELLIGENCE RECOMMENDATION MODEL, AND ELECTRONIC DEVICE" filed with the China National Intellectual Property Administration on Aug. 29, 2019. The two applications are incorporated herein by reference in their entirety.

FIELD OF THE TECHNOLOGY

This application relates to the field of artificial intelligence (AI) technologies, and in particular, to a feature processing method and apparatus for an AI recommendation model, an electronic device, and a storage medium.

BACKGROUND OF THE DISCLOSURE

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. Machine learning (ML) is a multi-field interdiscipline. ML is the core of the AI, and a fundamental way to make the computer intelligent. ML is applied in various fields.

Two aspects of training and application are involved when using an AI recommendation model, such as an advertisement recommendation model, constructed based on the ML. In a solution provided in the related art, features are extracted offline from training data stored in a log, to train models. The trained models are pushed to an online model service, and features are then extracted from online data to be processed, and are inputted to the model service to obtain a recommendation result. In the foregoing solution, an offline process and an online process are separated, and a potential difference may exist between the offline process of extracting features and the online process of extracting features. Consequently, features extracted offline and online from data with the same content may be inconsistent, resulting in poor strong consistency between the features.

SUMMARY

According to embodiments provided in this application, a feature processing method and apparatus for an artificial intelligence (AI) recommendation model, an electronic device, and a storage medium are provided.

The technical solutions in the embodiments of this application are implemented as follows:

An embodiment of this application provides a feature processing method for an AI recommendation model, performed by an electronic device. The method includes obtaining input data, and converting a data structure of the input data into a uniform sample structure; determining a feature group identifier and a feature extraction function that correspond to the AI recommendation model; extracting a feature group identifier, a feature identifier and a feature value of the input data from the converted input data according to the feature extraction function; and constructing a sample of the AI recommendation model according to the feature group identifier, the feature identifier and the feature value of the input data.

An embodiment of this application provides a feature processing apparatus for an AI recommendation model. The apparatus including: a conversion module, configured to obtain input data, and convert a data structure of the input data into a uniform sample structure; a function determining module, configured to determine a feature group identifier and a feature extraction function that correspond to the AI recommendation model; a feature extraction module, configured to perform feature extraction on the converted input data according to the feature extraction function, to obtain a feature group identifier, a feature identifier and a feature value of the input data; and a construction module, configured to construct a sample of the AI recommendation model according to the feature group identifier, the feature identifier and the feature value of the input data.

An embodiment of this application provides an electronic device, including a memory and a processor, the memory storing computer-readable instructions, the computer-readable instructions, when executed by the processor, causing the processor to perform the foregoing feature processing method for an AI recommendation model.

An embodiment of this application provides a non-transitory computer readable storage media storing computer-readable instructions, the computer-readable instructions, when executed by one or more processors, causing the one or more processors to perform the foregoing feature processing method for an AI recommendation model.

Details of one or more embodiments of this application are provided in the following accompanying drawings and descriptions. Other features, objectives, and advantages of this application become apparent from the specification, the accompanying drawings, and the claims.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other accompanying drawings from these accompanying drawings without creative efforts.

DESCRIPTION OF EMBODIMENTS

Figure 1:
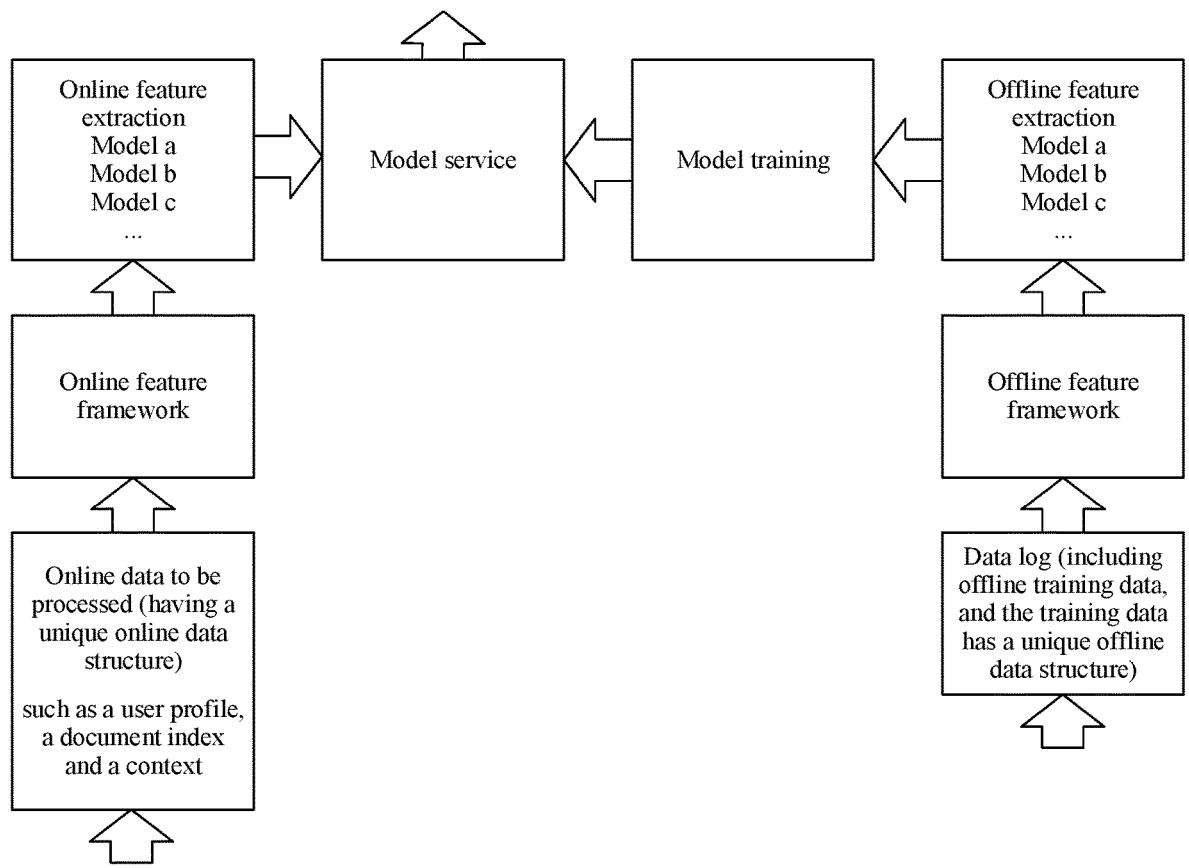
FIG. 1 is a schematic structural diagram of a feature extraction solution according to the related art.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, terms involved in the embodiments of this application are described. The terms provided in the embodiments of this application are applicable to the following explanations.

1) Sample (instance): A sample is also referred to as an example, and is used to be inputted to an artificial intelligence (AI) recommendation model to complete a corresponding task. In some embodiments consistent with the present disclosure, one sample includes several feature groups, one feature group includes several features, and one feature includes a feature identifier and a feature value.

2) Feature group: A feature group is also referred to as a feature domain, one feature group includes at least one feature, and there may be a correlation between included features. In addition, each feature group corresponds to one feature group identifier, and the feature group identifier may be briefly referred to as "gid."

3) Feature identifier: a feature identifier located at a next level of a feature group identifier. The feature identifier may be briefly referred to as "fid," and a combination of <gid, fid> can represent a global feature. The feature identifier cannot exist independently of the feature group identifier.

4) Feature value: A feature value is used for representing the meaning of a feature. According to different actual application scenarios, the feature value may take a binary value (that is, 0 or 1), or may be continuous. The feature value is represented by using a floating-point number, and may be briefly referred to as "fvalue."

5) Atomic feature: a smallest and indivisible feature. A feature group identifier of an atomic feature is referred to as an atomic feature group identifier, which may be referred to as "aid." A feature identifier of the atomic feature is referred to as an atomic feature identifier, which may be referred to as "afid." A feature value of the atomic feature is referred to as an atomic feature value, which may be referred to as "afvalue." For example, a sample is "user age: 20: 1", where the user age is an atomic feature group identifier, 20 is an atomic feature identifier, and 1 is an atomic feature value. Assuming that in the atomic feature value, the meaning of 1 is correct, and the meaning of 0 is wrong, a result indicating that the user age is 20 is correct in the sample.

6) Combined feature: a new feature obtained by combing any quantity of atomic features. A feature group identifier of a combined feature is referred to as a combined feature group identifier, which may be referred to as "cgid;" a feature identifier of the combined feature is referred to as a combined feature identifier, which may be referred to as "cfid;" and a feature value of the combined feature is referred to as a combined feature value, which may be referred to as "cfvalue." For example, a sample is "user age_user gender: 20_female: 1", where the user age_user gender is a combined feature group identifier, 20_female is a combined feature identifier, and 1 is a combined feature value. Assuming that in the combined feature value, the meaning of 1 is correct, and the meaning of 0 is wrong, a result indicating that the user age is 20 and the user gender is female is correct in the sample.

7) Data structure: a manner in which a computer stores and organizes data, for example, a set of data elements that have one or more specific relationships with each other.

In a service such as an advertisement service or a recommendation service, an AI recommendation model is often used to process related data. FIG. 1 shows service-related algorithm tasks such as recall and sorting, a data flow direction. That is, in an offline status, offline training data is extracted from a data log, and the training data has an offline data structure. Next, feature extraction is performed on the training data through an offline feature framework to extract features, to train models, for example, train a model a, a model b and a model c in FIG. 1. Then, the trained models are pushed to an online model service. In an online state, features are extracted through an online feature framework from data to be processed having an online data structure such as user profile data, document index data and context data shown in FIG. 1, the extracted features are inputted to the model service to obtain a result returned after model training in the model service, and a corresponding service operation is performed. For a feature framework part, there may be potential inconsistency between the offline feature framework and the online feature framework. For example, a servicer updates, according to service requirements, a method of extracting a specific feature in the offline feature framework, but does not synchronize a new extraction method to the online feature framework, resulting in inconsistency between features extracted from data with the same content but different data structures through the offline feature framework and the online feature framework, which adversely affects the application of the AI recommendation model.

Embodiments of this application provide a feature processing method and apparatus for an AI recommendation model, an electronic device, and a storage medium, to improve strong consistency between features and improve efficiency and flexibility of feature extraction. The following describes applications of the electronic device provided in the embodiments of this application.

Figure 2:
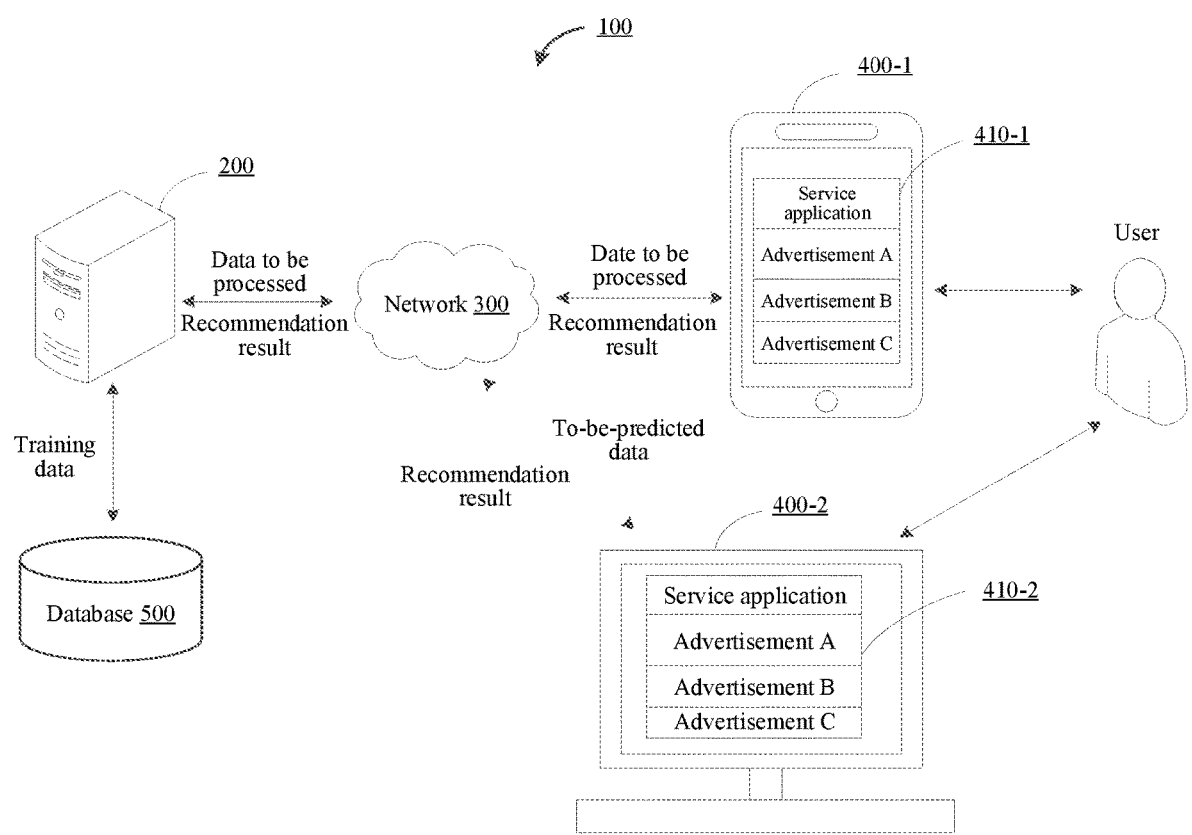
FIG. 2 is a schematic structural diagram of a feature processing system for an artificial intelligence (AI) recommendation model according to an embodiment of this application.

FIG. 2 is a schematic architectural diagram of a feature processing system 100 for an AI recommendation model according to an embodiment of this application. To support a feature processing application of the AI recommendation model, a terminal device 400 (a terminal device 400-1 and a terminal device 400-2 are exemplarily shown) is connected to a server 200 by a network 300. The network 300 may be a wide area network or a local area network, or a combination thereof. In addition, there is a communication connection between the server 200 and a database 500.

The terminal device 400 is configured to display a service application on a graphical interface 410 (a graphical interface 410-1 and a graphical interface 410-2 are exemplarily shown); and is further configured to generate online data to be processed in response to an operation performed by a user on the service application, and send the data to be processed to the server 200. The server 200 is configured to obtain the data to be processed from the terminal device 400; and is further configured to: convert a data structure of the data to be processed into a uniform sample structure; determine a feature group identifier and a feature extraction function that correspond to the AI recommendation model; perform feature extraction on the converted data to be processed according to the feature extraction function, to obtain a feature group identifier, a feature identifier and a feature value in the data to be processed; construct a sample according to the feature group identifier, the feature identifier and the feature value in the data to be processed; and predict the sample by using the AI recommendation model, to obtain a recommendation result, and send the recommendation result to the terminal device 400. The terminal device 400 is configured to display the recommendation result in the service application on the graphical interface 410. In FIG. 2, an advertisement A, an advertisement B and an advertisement C are exemplarily shown.

In addition, the server 200 is further configured to: obtain training data of the database 500; convert a data structure of the training data into a uniform sample structure; determine a feature group identifier and a feature extraction function that correspond to the AI recommendation model; perform feature extraction on the converted training data according to the feature extraction function, to obtain a feature group identifier, a feature identifier and a feature value in the training data; construct a training sample according to the feature group identifier, the feature identifier and the feature value in the training data; and train the AI recommendation model according to the training sample.

The following continues to describe applications of the electronic device provided in the embodiments of this application. The electronic device may be implemented as various types of terminal devices such as a notebook computer, a tablet computer, a desktop computer, a set-top box or a mobile device (for example, a mobile phone, a portable music player, a personal digital assistant (PDA), a dedicated messaging device, or a portable game device), or may be implemented as a server. Description is made below by using an example in which the electronic device is a server.

Figure 3:
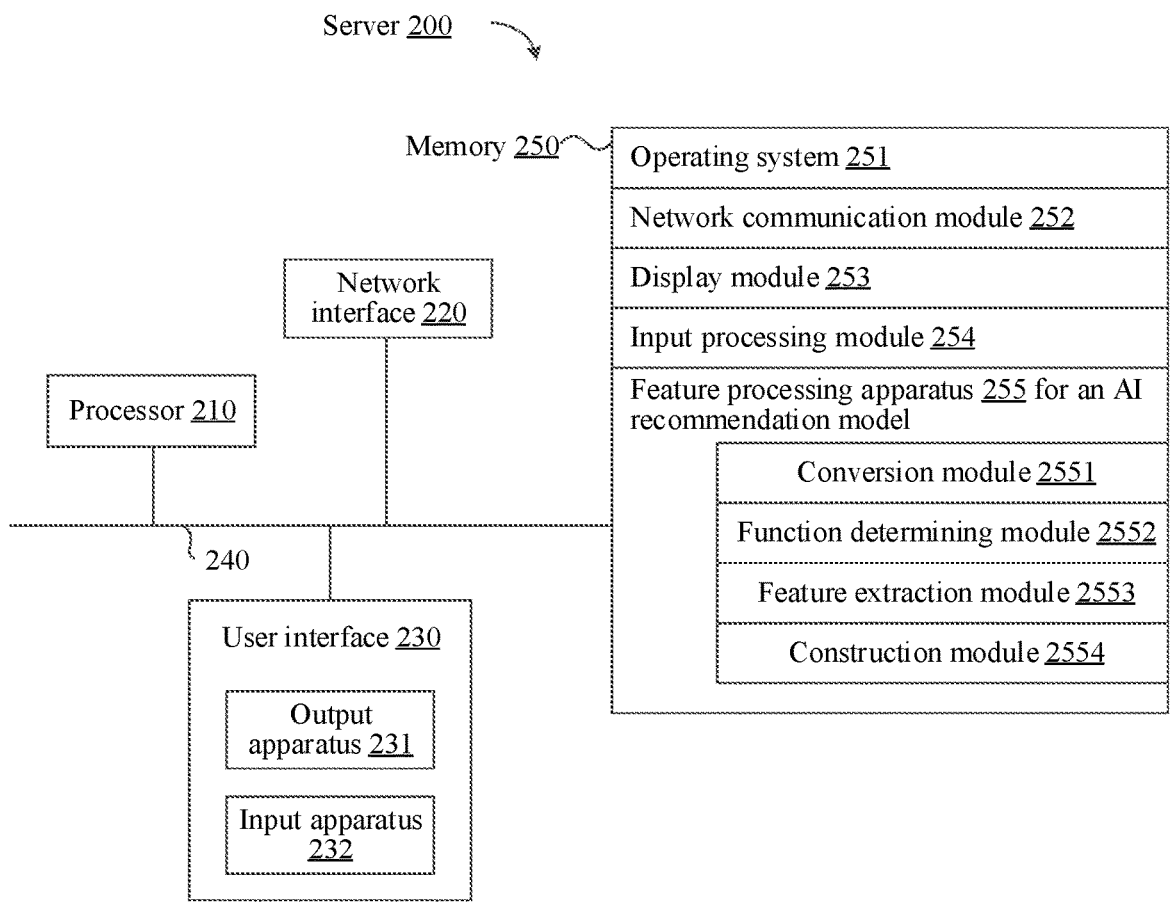
FIG. 3 is a schematic structural diagram of a server according to an embodiment of this application.

FIG. 3 is a schematic architectural diagram of a server 200 (for example, may be the server 200 in FIG. 2) according to an embodiment of this application. The server 200 shown in FIG. 3 includes: at least one processor 210, a memory 250, at least one network interface 220 and a user interface 230. Components in the server 200 are coupled together by using a bus system 240. It may be understood that the bus system 240 is configured to implement connection and communication between the components. In addition to a data bus, the bus system 240 further includes a power bus, a control bus, and a status signal bus. However, for ease of clear description, all types of buses are marked as the bus system 240 in FIG. 3.

The processor 210 may be an integrated circuit chip having a signal processing capability, for example, a general-purpose processor, a digital signal processor (DSP), or another programmable logic device (PLD), a discrete gate, transistor logical device, or discrete hardware component. The general-purpose processor may be a microprocessor, any conventional processor, or the like.

The user interface 230 includes one or more output apparatuses 231 that can display media content, including one or more loudspeakers and/or one or more visual display screens. The user interface 230 further includes one or more input apparatuses 232, including user interface components that facilitate inputting of a user, such as a keyboard, a mouse, a microphone, a touch display screen, a camera, and other input button and control.

The memory 250 may be a removable memory, a non-removable memory, or a combination thereof. Hardware devices include a solid-state memory, a hard disk drive, an optical disc drive, and the like. The memory 250 may include one or more storage devices physically far away from the processor 210.

The memory 250 includes a volatile memory or a non-volatile memory, or may include both a volatile memory and a non-volatile memory. The non-volatile memory may be a read-only memory (ROM). The volatile memory may be a random access memory (RAM). The memory 250 described in this embodiment is to include any other suitable type of memories. The non-volatile storage medium of the computer device may store an operating system and computer-readable instructions. The computer-readable instructions, when executed, may cause the processor to perform a feature processing method for an AI recommendation model. The volatile memory may alternatively store computer-readable instructions, and the computer-readable instructions, when executed by a processor, may cause the processor to perform the feature processing method for an AI recommendation model.

In some embodiments, the memory 250 may store data to support various operations. Examples of the data include a program, a module, and a data structure, or a subset or a superset thereof, which are described below by using examples.

An operating system 251 includes a system program configured to process various basic system services and perform a hardware-related task, such as a framework layer, a core library layer, or a driver layer, and is configured to implement various basic services and process a hardware-based task.

A network communication module 252 is configured to reach another computing device through one or more (wired or wireless) network interfaces 220. Network interfaces 220 include: Bluetooth, wireless compatible authentication (Wi-Fi), a universal serial bus (USB), and the like.

A display module 253 is configured to display information by using the one or more output apparatuses 231 (for example, a display screen or a loudspeaker) associated with the user interface 230 (for example, a user interface configured to operate a peripheral device and display content and information).

An input processing module 254 is configured to detect one or more user inputs or interactions from one of the one or more input apparatuses 232 and translate the detected input or interaction.

In some embodiments, a feature processing apparatus for an AI recommendation model provided in the embodiments of this application may be implemented by using software. FIG. 3 shows a feature processing apparatus 255 for an AI recommendation model stored in the memory 250. The feature processing apparatus for an AI recommendation model may be software in such a form as a program or a plug-in, and includes the following software modules: a conversion module 2551, a function determining module 2552, a feature extraction module 2553 and a construction module 2554. The modules are logical modules, and therefore may be randomly combined or further divided based on a function to be performed.

The following describes functions of the modules.

In some embodiments, the feature processing apparatus for an AI recommendation model provided in the embodiments of this application may be implemented by using hardware. For example, the feature processing apparatus for an AI recommendation model provided in the embodiments of this application may be a processor in the form of a hardware decoding processor, programmed to perform the feature processing method for an AI recommendation model provided in the embodiments of this application. For example, the processor in the form of the hardware decoding processor may use one or more application-specific integrated circuits (ASIC), a DSP, a PLD, a complex programmable logic device (CPLD), a field-programmable gate array (FPGA), or other electronic elements.

The feature processing method for an AI recommendation model provided in the embodiments of this application may be performed by the foregoing server, or may be performed by the terminal device (for example, may be the terminal device 400-1 and the terminal device 400-2 shown in FIG. 2), or may be performed by the server and the terminal device together.

The following describes a process of implementing the feature processing method for an AI recommendation model by using the embedded feature processing apparatus for an AI recommendation model in the electronic device with reference to the applications and a structure of the electronic device recorded above.

Figure 4A:
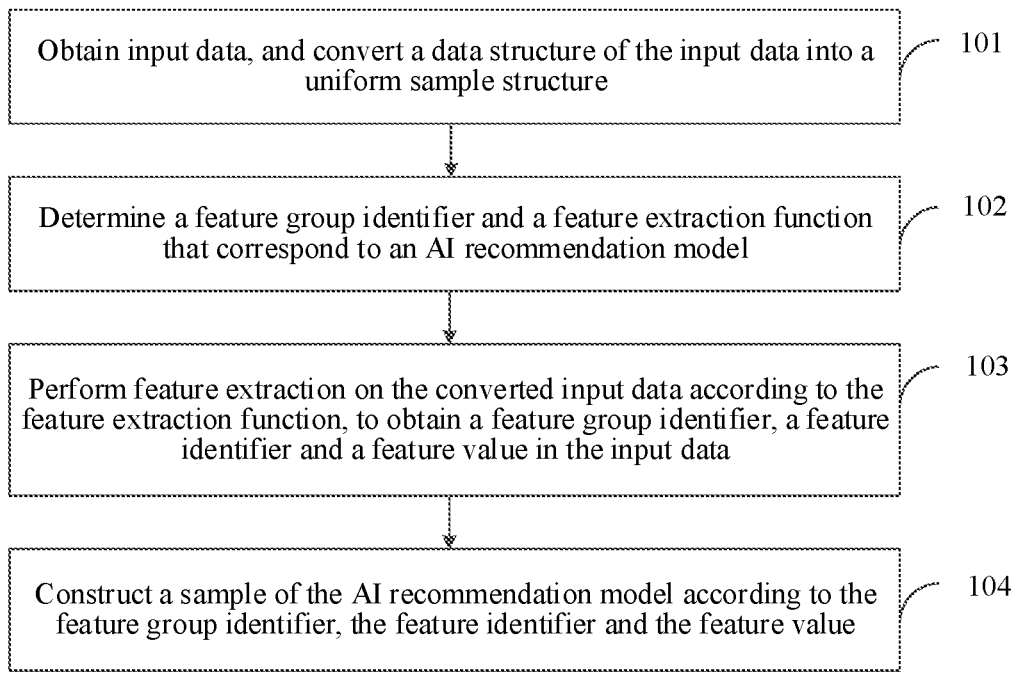
FIG. 4A is a schematic flowchart of a feature processing method for an AI recommendation model according to an embodiment of this application.

FIG. 4A is a schematic flowchart of a feature processing method for an AI recommendation model according to an embodiment of this application, and description is provided with reference to steps shown in FIG. 4A.

Step 101. Obtain input data, and convert a data structure of the input data into a uniform sample structure.

The input data herein may be data to be processed or training data. For example, when the AI recommendation model is an advertisement recommendation model, the data to be processed may be user profile data such as a user age and a gender, and the training data may include the user profile data and data of clicking, by a user, an advertisement (such as clicking or non-clicking). The data to be processed is obtained online, to quickly perform prediction and feedback, and the training data is often stored in a log; but, in an actual application scenario, for ease of storage, there is often a difference between a data structure of the data in the log and an online data structure. Therefore, in this embodiment, the data structure of the input data is converted into the uniform sample structure, to overcome the difference between the data structures and ensure consistency between meanings of fields in different types of input data. The uniform sample structure is in a cross-language data format, including, but not limited to, a protobuf format, a flatbuffers format, a thrift format, an avro format and a msgpack format. During conversion, the cross-language data format to be used is first determined, and a toolkit in a corresponding format is then invoked, to convert the data structure of the input data into the cross-language data format. After the conversion is completed, a file in a corresponding format is generated, and includes input data described in the cross-language data format.

Step 102. Determine a feature group identifier and a feature extraction function that correspond to an AI recommendation model.

A type of the AI recommendation model is not limited in this embodiment. For example, the AI recommendation model may be a recommendation model to which a linear regression, a support vector machine or a neural network is applied. In this step, a corresponding feature group identifier configured for an AI recommendation model is determined. The feature group identifier includes an atomic feature group identifier and/or a combined feature group identifier. This is determined according to an actual application scenario. For an AI recommendation model suitable for the same service type, there is a specific commonality in an aspect of required data. Therefore, corresponding feature group identifiers may be pre-configured for different service types, and in this step, a corresponding configured feature group identifier is determined according to a service type of the AI recommendation model. For example, the service types include a game recommendation type, a cosmetic recommendation type and a TV series recommendation type. A corresponding feature group identifier is configured for each service type, and a feature group identifier corresponding to the game recommendation type is determined when it is determined that the AI recommendation model is applicable to game recommendation. A feature extraction function corresponding to the AI recommendation model is determined while the feature group identifier corresponding to the AI recommendation model is determined. The feature extraction function is pre-configured, and each feature extraction function corresponds to one atomic feature group identifier. The feature extraction function is configured to parse the converted input data to obtain an atomic feature group identifier, and an atomic feature identifier and an atomic feature value that correspond to the atomic feature group identifier. When the feature extraction function is configured, for example, if the atomic feature group identifier is "user age", a field of "user age" is configured in the feature extraction function. Accordingly, by executing the feature extraction function, an atomic feature group identifier being "user age", and an atomic feature identifier and an atomic feature value that are related to the atomic feature group identifier may be recognized in the converted input data.

Step 103. Perform feature extraction on the converted input data according to the feature extraction function, to obtain a feature group identifier, a feature identifier and a feature value in the input data.

After feature extraction is performed according to the feature extraction function, the atomic feature group identifier, the atomic feature identifier and the atomic feature value in the converted input data are obtained. If the converted input data does not include a specific atomic feature group identifier, after the input data is processed according to a feature extraction function corresponding to the atomic feature group identifier, an obtained result is empty. When there are at least two determined feature extraction functions, feature extraction is performed on the converted input data according to each feature extraction function.

Step 104. Construct a sample of the AI recommendation model according to the feature group identifier, the feature identifier and the feature value in the input data.

The sample of the AI recommendation model is constructed according to a triplet of <feature group identifier: feature identifier: feature value>, and is used to be inputted to the AI recommendation model. Each feature group identifier corresponds to one single sample. For example, for the atomic feature group identifier "user age", a constructed sample is "user age: 20: 1". Because only the atomic feature group identifier, the atomic feature identifier, and the atomic feature value are obtained in step 103, the atomic feature identifier and the atomic feature value further need to be combined when the AI recommendation model further corresponds to a combined feature, and specific content is described below.

It can be learned from the foregoing implementation of FIG. 4A in this embodiment that, based on the uniform sample structure, feature extraction is performed on the input data by using the feature extraction function corresponding to the AI recommendation model, to obtain the required sample. A difference between a data structure of predicted data and the data structure of the training data is shielded in this embodiment, thereby ensuring strong consistency between the features and improving flexibility and efficiency of feature extraction.

Figure 4B:
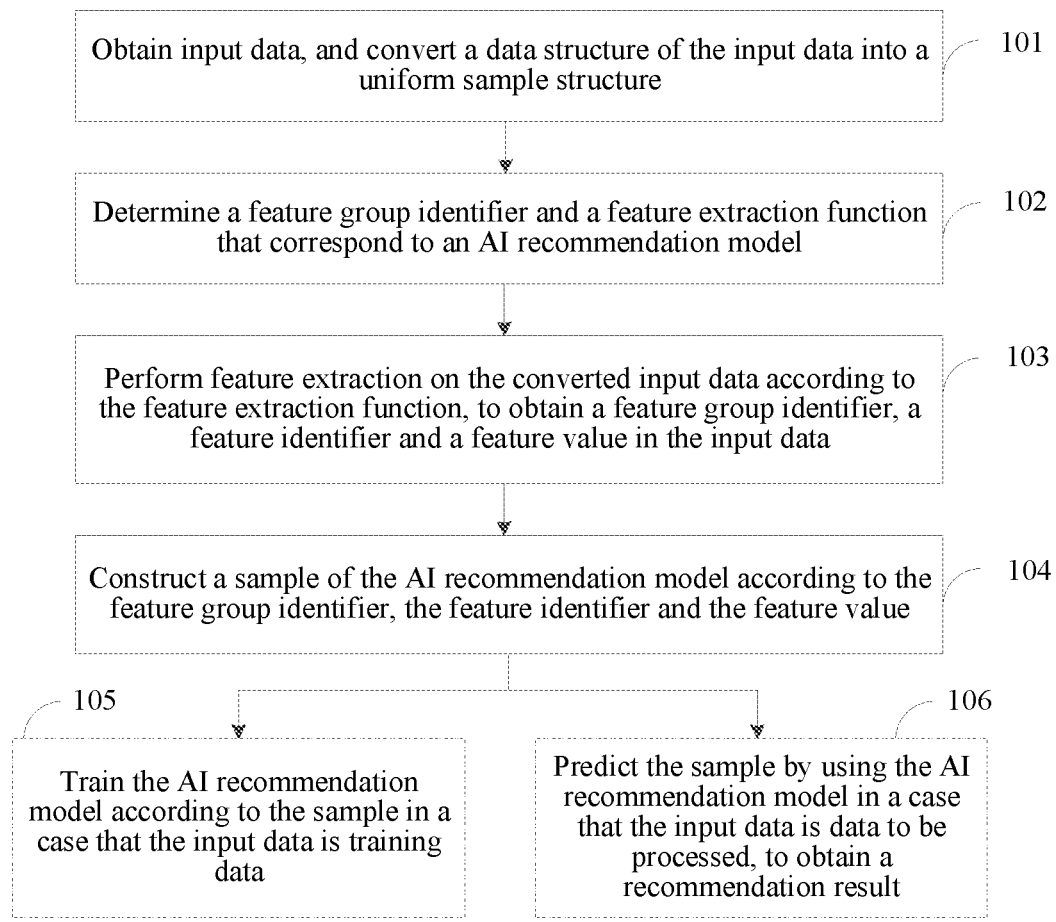
FIG. 4B is another schematic flowchart of a feature processing method for an AI recommendation model according to an embodiment of this application.

In some embodiments, FIG. 4B is a schematic flowchart of a feature processing method for an AI recommendation model according to an embodiment of this application. Based on FIG. 4A, after step 104, the AI recommendation model may be further trained according to the sample when the input data is training data in step 105.

For example, when the AI recommendation model is an advertisement recommendation model, a sample constructed according to input data is "user age_user gender_advertisement: 20_female_advertisement A: 1", where the input data is training data, and a feature value "1" indicates that the user clicks the advertisement A. During training, the user age "20" and the user gender "female" serving as an input parameter is inputted to the AI recommendation model, and a parameter in the AI recommendation model is adjusted according to a difference between an output parameter of the AI recommendation model and the feature value "1" in the sample, so that the difference between the output parameter of the AI recommendation model and the feature value in the sample is reduced when subsequent training is performed according to a new sample, that is, the accuracy of performing prediction by the AI recommendation model is improved. For example, when the AI recommendation model is a recommendation model to which a neural network is applied, backpropagation is performed according to the difference between the output parameter and the feature value "1" in the sample, to adjust a weight parameter of each layer of the neural network.

In some embodiments, the training the AI recommendation model according to the sample may be further implemented as follows: creating a copy of the AI recommendation model; and training the copy of the AI recommendation model according to the sample.

A process of model training and a process of model prediction may be separated herein. Specifically, a copy of the AI recommendation model is created, and the copy of the AI recommendation model is trained according to the sample corresponding to the training data. In the foregoing method, a disordered processing process caused because the AI recommendation model processes two types of samples at the same time is avoided.

In some embodiments, before the training the copy of the AI recommendation model according to the sample, the method further includes: determining a first accuracy rate of the copy of the AI recommendation model according to the sample.

An update time of the AI recommendation model may be determined by setting an accuracy rate mechanism. First, the first accuracy rate of the copy of the AI recommendation model is determined according to the sample. For example, the sample includes 100 subsamples, and the subsample herein refers to a triplet in the form of <feature group identifier: feature identifier: feature value>. An input parameter of each subsample is inputted to the copy of the AI recommendation model. For 70 subsamples in the sample, output parameters of the copy of the AI recommendation model conform to feature values in the subsamples. For other 30 subsamples, if output parameters do not conform to feature values, it may be determined that the first accuracy rate is 70%.

After the training the copy of the AI recommendation model according to the sample, the method further includes: determining a second accuracy rate of the trained copy of the AI recommendation model according to a sample corresponding to new training data; and updating the AI recommendation model according to the trained copy of the AI recommendation model when the second accuracy rate exceeds the first accuracy rate.

After the training of the copy of the AI recommendation model is completed, new training data is obtained to construct a sample. Similarly, a second accuracy rate of the trained copy of the AI recommendation model is determined according to the newly constructed sample. The AI recommendation model (the AI recommendation model herein is configured to process a sample corresponding to the data to be processed) is updated according to the trained copy of the AI recommendation model when the second accuracy rate exceeds the first accuracy rate; the copy of the AI recommendation model may be continuously trained according to the newly constructed sample when the second accuracy rate does not exceed the first accuracy rate. In the foregoing method, the accuracy rate of the AI recommendation model used for prediction is ensured, and a case that the accuracy rate is reduced due to relatively poor quality of the training data is avoided.

In some embodiments, the updating the AI recommendation model according to the trained copy of the AI recommendation model may be implemented as follows: obtaining a generation rate of training data; and updating the AI recommendation model according to the trained copy of the AI recommendation model when the generation rate is less than a generation rate threshold.

For example, an amount of newly obtained training data is counted once at specific intervals. The AI recommendation model is updated according to the trained copy of the AI recommendation model when the generation rate is less than a set generation rate threshold, for example, the generation rate is 10 pieces in one minute, and the generation rate threshold is 11 pieces in one minute. The update of the AI recommendation model is performed in the foregoing method, thereby reducing a service delay caused by the update of the model.

In some embodiments, before the training the AI recommendation model according to the sample, the method further includes: obtaining a feature adjustment identifier and a corresponding adjustment value; determining, from the sample, each group of a feature group identifier, a feature identifier and a feature value that conform to the feature adjustment identifier as a first subsample; and updating a weight value of the first subsample to the adjustment value, the feature adjustment identifier being one of the following: a feature group identifier, and a feature group identifier and a feature identifier.

For example, the feature adjustment identifier and the adjustment value are set according to an emphasis condition of a service. For example, when a user service focuses more on a user whose user age is 20, a feature adjustment identifier is set to include a feature group identifier and a feature identifier, which is specifically <user age: 20>, and a corresponding adjustment value is 2. The sample includes the triplet of <feature group identifier: feature identifier: feature value>. The triplet is named as a subsample, and a feature value in the subsample may be 0 or 1, where 0 indicates that a corresponding user clicks the advertisement A and 1 indicates that the corresponding user clicks the advertisement B, and a weight value of the subsample (sample_weight) is 1 by default. In this case, a subsample including <user age: 20> in the sample is determined as a first subsample (regardless of the feature value) according to the feature adjustment identifier, and a weight value of the first subsample is updated to 2, to increase a weight proportion of the first subsample to the entire sample. In the foregoing method, the flexibility of model training is improved, and a weight proportion of each subsample may be adjusted according to an actual application scenario.

Step 106. Predict the sample by using the AI recommendation model when the input data is data to be processed, to obtain a recommendation result.

Similarly, the foregoing example is used as an example. After feature extraction, a sample constructed according to the input data is "user age_user gender: 20_female: 1", where the input data is the data to be processed, and the feature value "1" represents that data of the sample is correct data. During prediction, the user age "20" and the user gender "female" in the sample serving as an input parameter is inputted to the AI recommendation model, and the output parameter of the AI recommendation model is used as a probability that the user clicks the advertisement A, to determine, through service logic, whether to recommend the advertisement A to the user, to obtain a corresponding recommendation result. For example, if the probability exceeds 70%, it is determined that the advertisement A is recommended; if the probability does not exceed 70%, it is determined that the advertisement A is not recommended.

It can be learned from the foregoing implementation of FIG. 4B in this embodiment that, the sample corresponding to the training data is used as the training sample, to train the AI recommendation model; and the sample corresponding to the data to be processed is used as the sample to be inputted to the AI recommendation model to obtain the recommendation result, thereby improving the targeting performance for different types of input data.

Figure 4C:
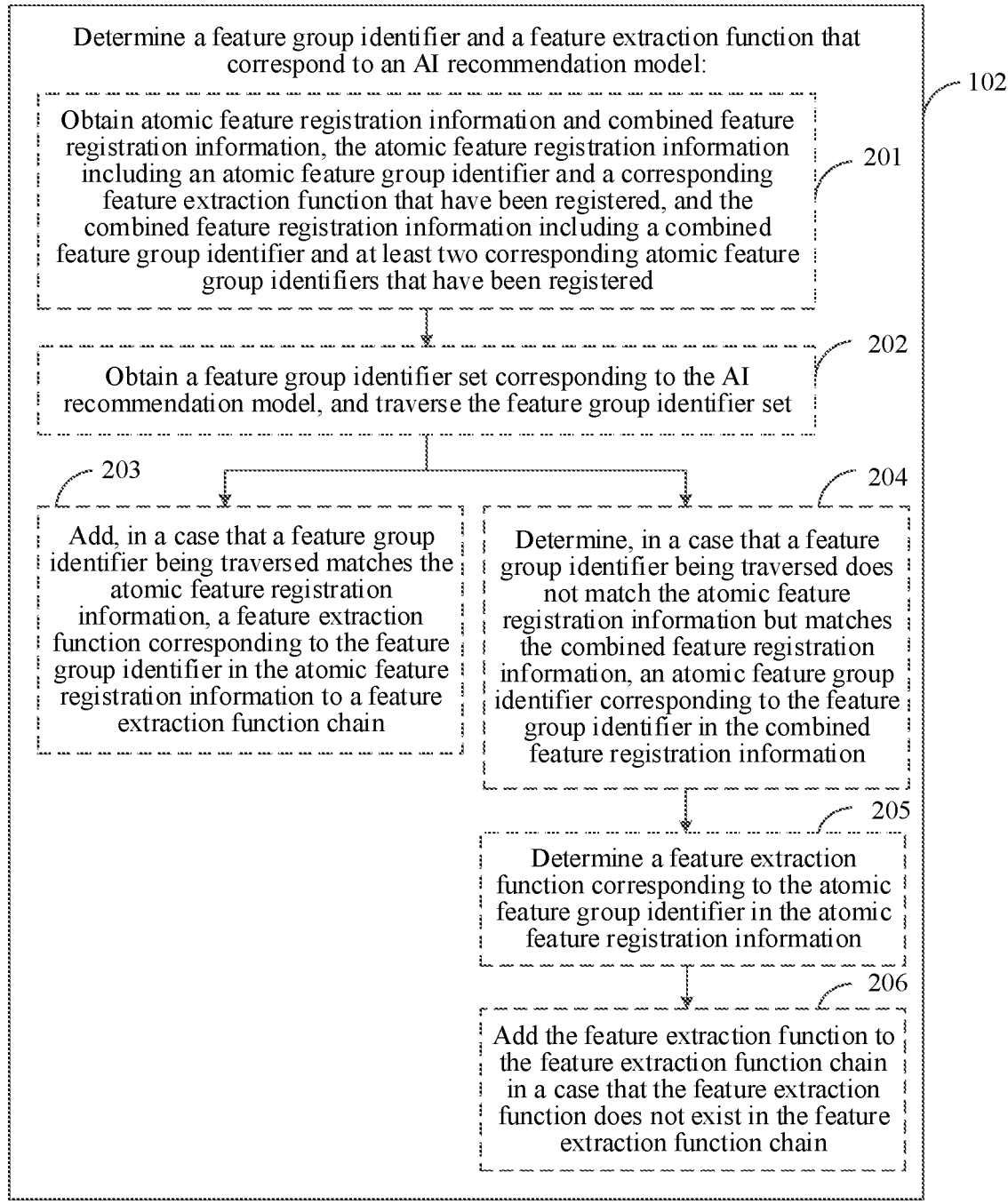
FIG. 4C is a schematic flowchart of determining a feature group identifier and a feature extraction function that correspond to an AI recommendation model according to an embodiment of this application.

In some embodiments, FIG. 4C is a schematic flowchart of determining a feature group identifier and a feature extraction function that correspond to an AI recommendation model according to an embodiment of this application. Based on FIG. 4A, step 102 may be implemented by using step 201 to step 206, and description is provided with reference to the steps.

Step 201. Obtain atomic feature registration information and combined feature registration information, the atomic feature registration information including an atomic feature group identifier and a corresponding feature extraction function that have been registered, and the combined feature registration information including a combined feature group identifier and at least two corresponding atomic feature group identifiers that have been registered.

In this step, the atomic feature registration information and the combined feature registration information are not limited to registration information in the AI recommendation model, but are global registration information. The atomic feature registration information includes the atomic feature group identifier and the corresponding feature extraction function that have been registered, and the combined feature registration information includes the combined feature group identifier and the at least two corresponding atomic feature group identifiers that have been registered. For example, the combined feature registration information includes a combined feature group identifier "user age_user gender" and two corresponding atomic feature group identifiers: "user age" and "user gender".

Step 202. Obtain a feature group identifier set corresponding to the AI recommendation model, and traverse the feature group identifier set.

The obtained feature group identifier set is different from the registration information in step 201. The feature group identifier set is not global but includes only feature group identifiers serving as construction elements of the sample, and the sample is a sample corresponding to the AI recommendation model. The feature group identifier set includes at least one feature group identifier. After being obtained, the feature group identifier set is traversed.

Step 203. Add, when a feature group identifier being traversed matches the atomic feature registration information, a feature extraction function corresponding to the feature group identifier in the atomic feature registration information to a feature extraction function chain.

Each time a feature group identifier is being traversed, matching between the feature group identifier and each atomic feature group identifier in the atomic feature registration information is performed, to determine whether the feature group identifier is the same as the atomic feature group identifier in the atomic feature registration information. If so, it is determined that the feature group identifier matches the atomic feature registration information, and a feature extraction function corresponding to the feature group identifier in the atomic feature registration information is added to a set feature extraction function chain. The feature extraction function chain herein refers to a set of feature extraction functions rather than a specific storage structure.

Step 204. Determine, when a feature group identifier being traversed does not match the atomic feature registration information but matches the combined feature registration information, a target atomic feature group identifier corresponding to the feature group identifier in the combined feature registration information.

When the feature group identifier being traversed matches none of all atomic feature group identifiers in the atomic feature registration information, matching between the feature group identifier and each combined feature group identifier in the combined feature registration information is performed, to determine whether the feature group identifier is the same as the combined feature group identifier in the combined feature registration information. If so, all target atomic feature group identifiers corresponding to the feature group identifier in the combined feature registration information are determined. No processing is performed when the feature group identifier being traversed does not match the atomic feature registration information, and either does not match the combined feature registration information.

Step 205. Determine a target feature extraction function corresponding to the target atomic feature group identifier in the atomic feature registration information.

For each determined target atomic feature group identifier, a corresponding target feature extraction function is determined in the atomic feature registration information.

Step 206. Add the target feature extraction function to the feature extraction function chain when the target feature extraction function does not exist in the feature extraction function chain.

No processing is performed when the determined target feature extraction function exists in the feature extraction function chain; the target feature extraction function is added to the feature extraction function chain when the determined target feature extraction function does not exist in the feature extraction function chain.

In one embodiment, the feature extraction function is represented by using fa, and the feature extraction function chain is represented by using fa_chain. It is assumed that the obtained atomic feature registration information includes "agid1-fa1" and "agid2-fa2", where "agid1-fa1" represents an atomic feature group identifier agid1 and a corresponding feature extraction function fa1, the obtained combined feature registration information includes "cgid1-(agid1, agid2)", and the feature group identifier set includes feature group identifiers agid1 and cgid1. A process of constructing fa_chain is described in the form of numbers:

(1) When the feature group identifier agid1 is being traversed in the feature group identifier set, and it is determined that agid1 matches the atomic feature registration information, and fa1 corresponding to agid1 in the atomic feature registration information is added to fa_chain.

(2) When the feature group identifier cgid1 is being traversed in the feature group identifier set, it is determined that cgid1 does not match the atomic feature registration information, it is then determined that cgid1 matches the combined feature registration information, and two atomic feature group identifiers agid1 and agid2 corresponding to cgid1 in the combined feature registration information are obtained. fa1 corresponding to agid1 in the atomic feature registration information has been added to fa_chain, and therefore no processing is performed; fa2 corresponding to agid2 in the atomic feature registration information does not exist in fa_chain, and therefore fa2 is added to fa_chain.

(3) All the feature group identifiers in the feature group identifier set have been traversed, and fa_chain is outputted.

Figure 4D:
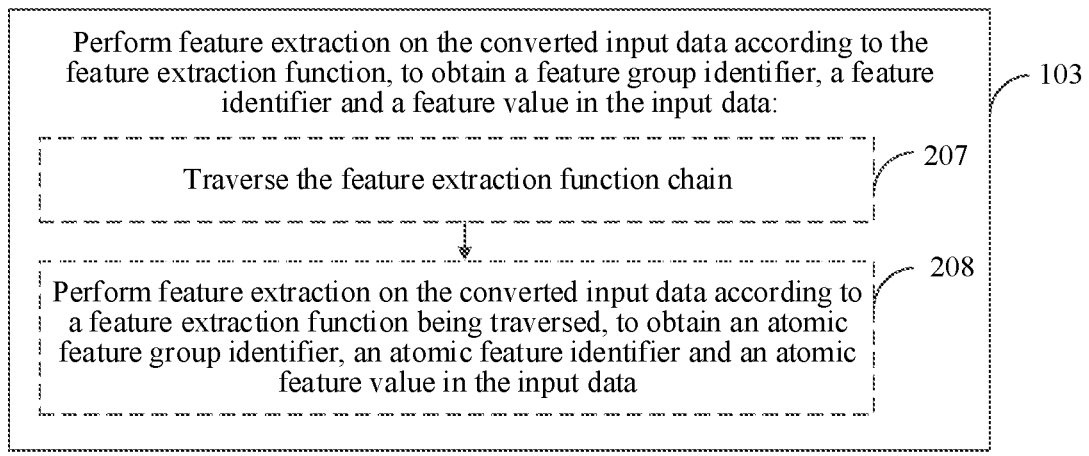
FIG. 4D is a schematic flowchart of performing feature extraction on a converted input data according to the feature extraction function, to obtain a feature group identifier, a feature identifier and a feature value in the input data according to an embodiment of this application.

In some embodiments, FIG. 4D is a schematic flowchart of performing feature extraction on a converted input data according to the feature extraction function, to obtain a feature group identifier, a feature identifier and a feature value in the input data according to an embodiment of this application. Based on FIG. 4A and FIG. 4C, step 103 may be implemented by using step 207 and step 208, and description is provided with reference to the steps.

Step 207. Traverse the feature extraction function chain.

Feature extraction is performed on the converted input data according to the feature extraction function chain. First, the feature extraction function chain is traversed.

Step 208. Perform feature extraction on the converted input data according to a feature extraction function being traversed, to obtain an atomic feature group identifier, an atomic feature identifier and an atomic feature value in the input data.

Feature extraction is performed on the converted input data according to each feature extraction function being traversed until the traversal is completed. The feature extraction function only recognizes an atomic feature group identifier corresponding to the function, and an atomic feature identifier and an atomic feature value that are related to the atomic feature group identifier in the input data.

Figure 4E:
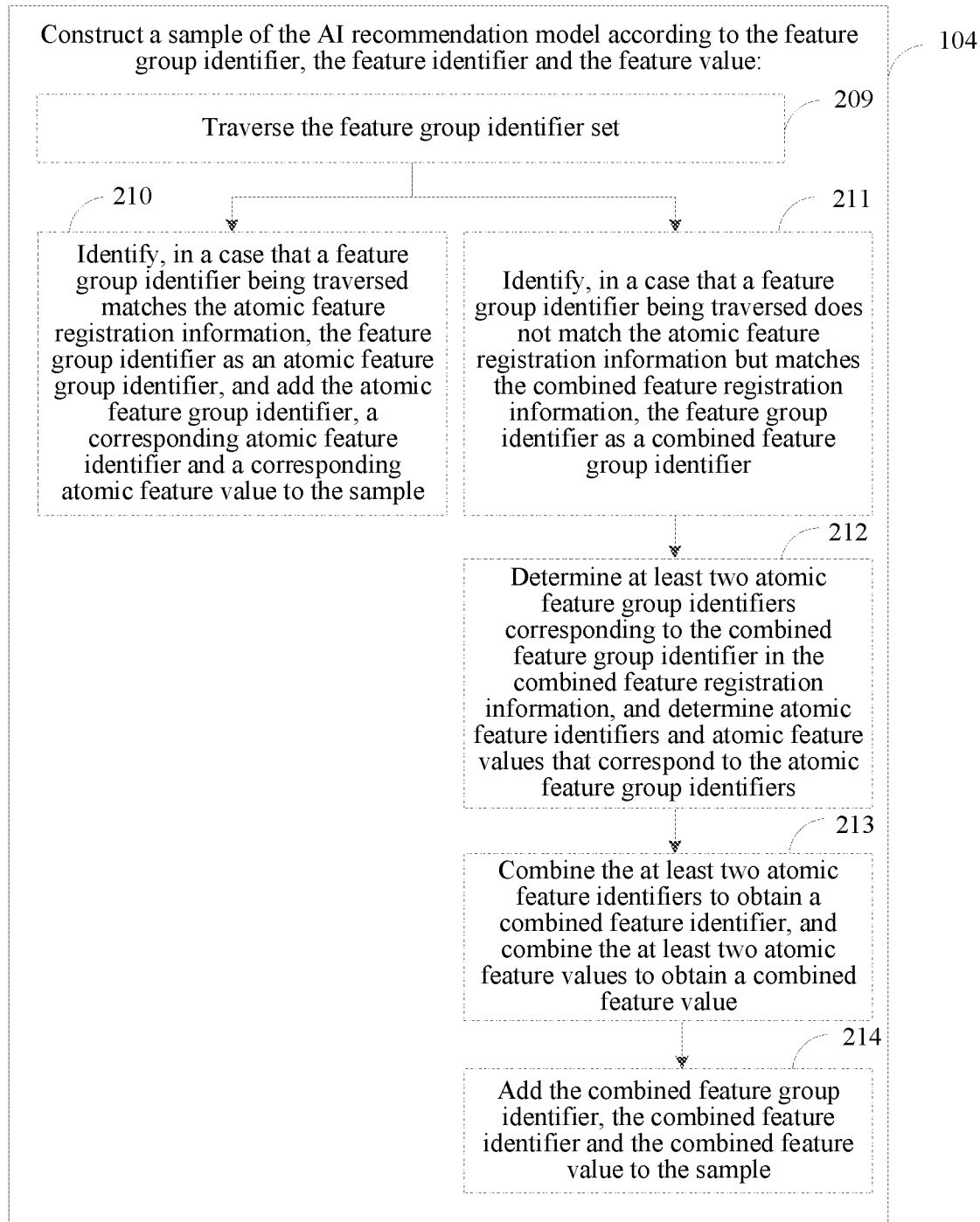
FIG. 4E is a schematic flowchart of constructing a sample of the AI recommendation model according to the feature group identifier, the feature identifier and the feature value according to an embodiment of this application.

In some embodiments, FIG. 4E is a schematic flowchart of constructing a sample of the AI recommendation model according to the feature group identifier, the feature identifier and the feature value according to an embodiment of this application. Based on FIG. 4A, FIG. 4C and FIG. 4D, step 104 may be implemented by using step 209 to step 214, and description is provided with reference to the steps.

Step 209. Traverse the feature group identifier set.

When the sample of the AI recommendation model is constructed, the feature group identifier set is also traversed.

Step 210. Determine, when a feature group identifier being traversed matches the atomic feature registration information, the feature group identifier as a first atomic feature group identifier, and add the first atomic feature group identifier, a corresponding atomic feature identifier and a corresponding atomic feature value to the sample.

When the feature group identifier being traversed is the same as an atomic feature group identifier in the atomic feature registration information, the feature group identifier is determined as the atomic feature group identifier, and the atomic feature group identifier, the corresponding atomic feature identifier and the corresponding atomic feature value (that are determined by using step 208) are added to the sample.

Step 211. Determine, when a feature group identifier being traversed does not match the atomic feature registration information but matches the combined feature registration information, the feature group identifier as a combined feature group identifier.

When the feature group identifier being traversed is different from each of all the atomic feature group identifiers in the atomic feature registration information, and is the same as a combined feature group identifier in the combined feature registration information, the feature group identifier is determined as a first combined feature group identifier.

Step 212. Determine at least two first atomic feature group identifiers corresponding to the first combined feature group identifier in the combined feature registration information, and determine atomic feature identifiers and atomic feature values that correspond to the at least two first atomic feature group identifiers.

For ease of description, for example, if the feature group identifier being traversed is cgid1, and atomic feature group identifiers corresponding to cgid1 in the combined feature registration information include agid1 and agid2, an atomic feature identifier afid1 and an atomic feature value afvalue1 that correspond to agid1 and an atomic feature identifier afid2 and an atomic feature value afvalue2 that correspond to agid2 are determined according to the feature extraction result in step 208.

Step 213. Combine the atomic feature identifiers corresponding to the at least two first atomic feature group identifiers to obtain a combined feature identifier, and combine the atomic feature values corresponding to the at least two first atomic feature group identifiers to obtain a combined feature value.

For example, afid1 and afid2 are combined to obtain a combined feature identifier cfid1, and afvalue1 and afvalue2 are combined to obtain a combined feature value cfvalue1.

In some embodiments, the combining the atomic feature identifiers corresponding to the at least two first atomic feature group identifiers to obtain a combined feature identifier may be further implemented as follows: performing a first combination operation on the atomic feature identifiers corresponding to the at least two first atomic feature group identifiers to obtain the combined feature identifier, the first combination operation including at least one of the following: a hash operation, a bitwise OR operation, a bitwise AND operation, and a bitwise XOR operation.

The at least two atomic feature identifiers (for example, afid1 and afid2 described above) may be combined by applying different first combination operations according to different actual application scenarios, to obtain the combined feature identifier (for example, cfid1 described above), and the first combination operation includes, but not limited to, a hash operation, a bitwise OR operation, a bitwise AND operation, and a bitwise XOR operation.

In some embodiments, the combining the atomic feature values corresponding to the at least two first atomic feature group identifiers to obtain a combined feature value may be further implemented as follows: performing a second combination operation on the atomic feature values corresponding to the at least two first atomic feature group identifiers to obtain the combined feature value, the second combination operation including at least one of the following: a multiplication operation and an addition operation.

The at least two atomic feature values (for example, afvalue1 and afvalue2 described above) may be combined by applying different second combination operations according to different actual application scenarios, to obtain the combined feature value (for example, cfvalue1 described above), and the second combination operation includes, but not limited to, a multiplication operation and an addition operation.

Step 214. Add the first combined feature group identifier, the combined feature identifier and the combined feature value to the sample.

After being obtained through combination, the combined feature identifier and the combined feature value are added to the sample in the form of a triplet of <combined feature group identifier: combined feature identifier: combined feature value>, for example, <cgid1: cfid1: cfvalue1>.

It can be learned from the foregoing implementation of FIG. 4C in this embodiment that, the registration information is obtained, and the corresponding feature extraction function is determined according to the feature group identifier set of the AI recommendation model, thereby generating the sample related to the AI recommendation model, and improving the flexibility and expandability of feature extraction. That is, features related to the input data may be determined according to different feature group identifier sets.

Figure 5:
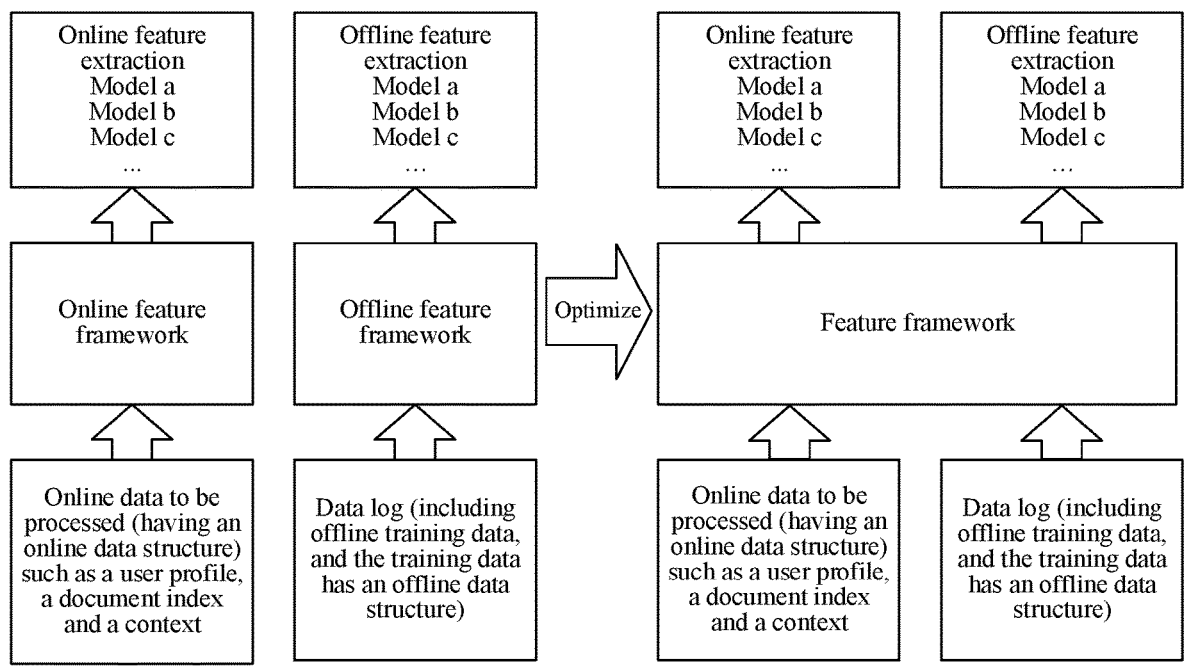
FIG. 5 is a schematic diagram of a comparison between feature extraction architectures according to an embodiment of this application.

FIG. 5 is a schematic diagram of a comparison between feature extraction architectures according to an embodiment of this application. The left diagram in FIG. 5 shows a feature extraction architecture according to the related art. For offline training data, features are extracted by using an offline feature framework, and a model is trained according to the extracted features; and for online data to be processed, features are extracted by using an online feature framework, and the extracted features are processed according to the model, to obtain a result. The right diagram in FIG. 5 shows a feature extraction architecture obtained by applying the feature processing method in the embodiments of this application. Regardless of the offline training data or the online data to be processed, extraction is performed by using a uniform feature framework, thereby avoiding inconsistency between extracted features that is caused by a difference between the frameworks.

Figure 6:
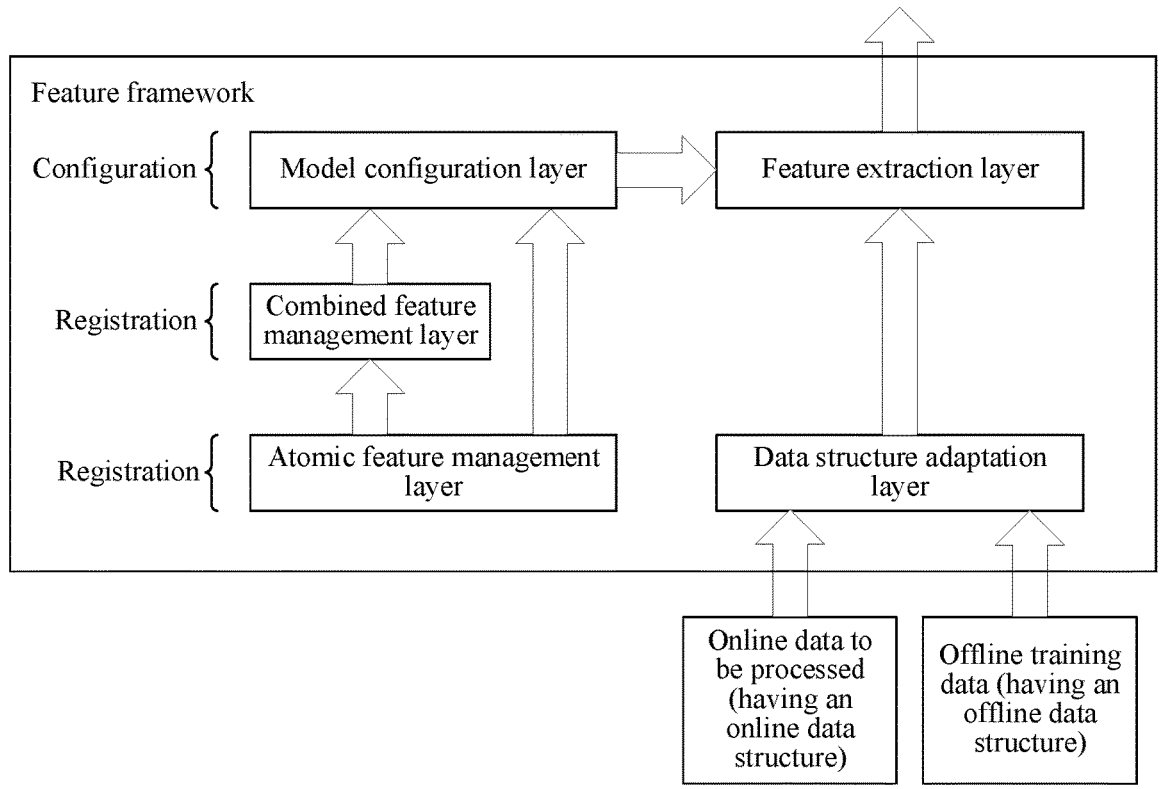
FIG. 6 is a schematic structural diagram of a feature extraction framework according to an embodiment of this application.

FIG. 6 is a schematic structural diagram of a feature extraction framework according to an embodiment of this application, including a data structure adaptation layer, an atomic feature management layer, a combined feature management layer, a model configuration layer and a feature extraction layer. For ease of understanding, the following describes functions of the layers one by one with reference to pseudocode in a bottom-up manner.

A first layer of the feature framework, that is, the data structure adaptation layer, is configured to adapt data structures of different types of input data and convert the data structures into a uniform sample structure, to ensure consistency between meanings of fields. The uniform sample structure may be defined as a universal cross-language data format including, but not limited to, protobuf, flatbuffers, thrift, avro and msgpack. Specifically, the input data may be processed by invoking a toolkit in a corresponding cross-language data format, to convert the data structure.

The atomic feature management layer is configured to store atomic feature registration information. For ease of description, the atomic feature registration information is represented by fa_rule, and fa_rule includes several atomic feature group identifiers agid and a feature extraction function fa that has a mapping relationship with each agid. fa is configured to process data to which the uniform sample structure is applied, to output a corresponding agid and a mapping from afid to afvalue, and fa may be pre-configured according to an actual application scenario, and establishes a mapping relationship with the corresponding agid.

The combined feature management layer is configured to store combined feature registration information. For ease of description, the combined feature registration information is represented by using fc_rule, and fc_rule includes a combined feature group identifier cgid and at least two agids that have a mapping relationship with cgid. The data structure adaptation layer, the atomic feature management layer and the combined feature management layer all belong to a "registration" stage. That is, a uniform data structure adaptation layer, atomic feature management layer and combined feature management layer may be used continuously for each of feature extraction frameworks applied to different types of AI recommendation models.

In a "configuration" stage, a configuration related to the AI recommendation model is performed.

In the model configuration layer, based on fa_rule and fc_rule that have been pre-registered, several atomic features and/or several combined features are selected as a model configuration to be added to the feature framework, and the selection is based on a feature group identifier set corresponding to the AI recommendation model, which may be referred to as "model_rule." In the feature framework, a fa chain, that is, fa_chain is generated by combining the atomic feature and the combined feature that have been registered, and fa_chain is used for subsequent feature extraction. A pseudocode procedure of the generation process is as follows:

Function: generate fa_chain
 Input: a feature group identifier set model_rule, and model_rule is a gid set
 Input: atomic feature registration information fa_rule, and fa_rule includes a mapping from agid to fa
 Input: combined feature registration information fc_rule, and fc_rule includes a mapping from cgid to "an agid set"
 Output: a fa chain fa_chain
 Initialize fa_chain;
 For each gid in model_rule, execute:
 When gid is agid in fa_rule, execute:
 Determine fa that has a mapping with gid in fa_rule, that is, fa_rule[gid], and insert fa_rule[gid] into fa_chain;
 When gid is not agid in fa_rule but cgid in fc_rule, execute:
 Determine "an agid set" that has a mapping with gid in fc_rule, that is, fc_rule[gid], and for each agid in fc_rule[gid], execute:
 When fa that has a mapping with agid, that is, fa_rule[agid] does not exist in fa_chain, execute:
 Insert fa_rule[agid] into fa_chain; and
 Output fa_chain.

The feature extraction layer is a core layer of the feature extraction framework, and is configured to output a series of features in input data in the form of a sample. The pseudocode is as follows:

Function: obtain a sample instance
 Input: model_rule, fa_rule, fc_rule and fa_chain
 Input: online data to be processed or offline training data, represented by using s
 Output: a sample instance
 Initialize instance;
 Convert s into data u having a uniform sample structure;
 Initialize a mapping array map;
 For each fa in fa_chain, execute:
 Perform feature extraction on u according to fa, to obtain agid, and a mapping from afid to afvalue, represented by using afid_afvalue_map;
 map[agid]=afid_afvalue_map, that is, afid_afvalue_map is used as a value of map[agid];
 For each gid in model_rule, execute:
 When gid is agid in fa_rule, execute:
 instance[gid]=map[gid], that is, a correspondence between gid and afid_afvalue_map is stored in a sample;
 When gid is not agid in fa_rule but cgid in fc_rule, execute:
 Initialize a combined mapping array cross_map;
 Determine "an agid set" that has a mapping with gid in fc_rule, that is, fc_rule[gid], and for each agid in fc_rule[gid], execute:
 cross_map[agid]=map[agid];
 Execute instance[gid]=fc(cross_map), that is, add a combined feature to an instance, where fc is a feature combination function; and
 Output the instance, where
 pseudocode of the feature combination function fc is as follows:
 Function: fc
 Input: cross_map, including a mapping from agid to "afid_afvalue_map"
 Output: a mapping from cfid to cfvalue, represented by using cfid_cfvalue_map Assume that all agids in cross_map are represented by using agid_1, agid_2, ..., and agid_n sequentially, and corresponding "afid_afvalue_maps" are represented by using afid_afvalue_map_1, afid afvalue_map 2, ..., and afid_afvalue_map_n sequentially, where n is an integer greater than 1;
 Initialize cfid_cfvalue_map;
 Perform a first combination operation on afid_1, afid_2, ..., and afid_n, to obtain cfid, the first combination operation including, but not limited to, a hash operation, a bitwise OR operation, a bitwise AND operation, and a bitwise XOR operation;
 Perform a second combination operation on afvalue_1, afvalue_2, ..., and afvalue_n, to obtain cfvalue, the second combination operation including, but not limited to, a multiplication operation and an addition operation;
 cfid_cfvalue_map[cfid]=cfvalue, that is, establish a mapping relationship between cfid and cfvalue;
 Output cfid_cfvalue_map;

By using the foregoing uniform feature framework, features may be extracted from the converted input data according to the feature group identifier set corresponding to the AI recommendation model, to constitute a sample, thereby performing a task of model training or model prediction, improving strong consistency between the features, and overcoming the difference between the extracted features that is caused by the application of two frameworks.

The following continues to describe a structure in which a feature processing apparatus 255 for an AI recommendation model provided in the embodiments of this application is implemented by software modules. In some embodiments, as shown in FIG. 3, the software modules that are in the feature processing apparatus 255 for an AI recommendation model and are stored in the memory 250 may include:

a conversion module 2551, configured to obtain input data, and convert a data structure of the input data into a uniform sample structure;
 a function determining module 2552, configured to determine a feature group identifier and a feature extraction function that correspond to the AI recommendation model;
 a feature extraction module 2553, configured to perform feature extraction on the converted input data according to the feature extraction function, to obtain a feature group identifier, a feature identifier and a feature value in the input data; and
 a construction module 2554, configured to construct a sample of the AI recommendation model according to the feature group identifier, the feature identifier and the feature value in the input data.

In some embodiments, the function determining module 2552 is further configured to: obtain atomic feature registration information and combined feature registration information, the atomic feature registration information including an atomic feature group identifier and a corresponding feature extraction function that have been registered, and the combined feature registration information including a combined feature group identifier and at least two corresponding atomic feature group identifiers that have been registered; obtain a feature group identifier set corresponding to the AI recommendation model, and traverse the feature group identifier set; and add, when a feature group identifier being traversed matches the atomic feature registration information, a feature extraction function corresponding to the feature group identifier in the atomic feature registration information to a feature extraction function chain.

In some embodiments, the function determining module 2552 is further configured to: determine, when a feature group identifier being traversed does not match the atomic feature registration information but matches the combined feature registration information, a target atomic feature group identifier corresponding to the feature group identifier in the combined feature registration information; determine a target feature extraction function corresponding to the target atomic feature group identifier in the atomic feature registration information; and add the target feature extraction function to the feature extraction function chain when the target feature extraction function does not exist in the feature extraction function chain.

In some embodiments, the feature extraction module 2553 is further configured to: traverse the feature extraction function chain; and perform feature extraction on the converted input data according to a feature extraction function being traversed, to obtain an atomic feature group identifier, an atomic feature identifier and an atomic feature value in the input data.

In some embodiments, the construction module 2554 is further configured to: traverse the feature group identifier set; and determine, when a feature group identifier being traversed matches the atomic feature registration information, the feature group identifier as a first atomic feature group identifier, and add the first atomic feature group identifier, a corresponding atomic feature identifier and a corresponding atomic feature value to the sample.

In some embodiments, the construction module 2554 is further configured to: determine, when a feature group identifier being traversed does not match the atomic feature registration information but matches the combined feature registration information, the feature group identifier as a first combined feature group identifier; determine at least two first atomic feature group identifiers corresponding to the first combined feature group identifier in the combined feature registration information, and determine atomic feature identifiers and atomic feature values that correspond to the at least two first atomic feature group identifiers; combine the atomic feature identifiers corresponding to the at least two first atomic feature group identifiers to obtain a combined feature identifier, and combine the atomic feature values corresponding to the at least two first atomic feature group identifiers to obtain a combined feature value; and add the first combined feature group identifier, the combined feature identifier and the combined feature value to the sample.

In some embodiments, the combining the atomic feature identifiers corresponding to the at least two first atomic feature group identifiers to obtain a combined feature identifier includes: performing a first combination operation on the atomic feature identifiers corresponding to the at least two first atomic feature group identifiers to obtain the combined feature identifier, the first combination operation including at least one of the following: a hash operation, a bitwise OR operation, a bitwise AND operation, and a bitwise XOR operation.

The combining the atomic feature values corresponding to the at least two first atomic feature group identifiers to obtain a combined feature value includes: performing a second combination operation on the atomic feature values corresponding to the at least two first atomic feature group identifiers to obtain the combined feature value, the second combination operation including at least one of the following: a multiplication operation and an addition operation.

In some embodiments, the feature processing apparatus 255 for an AI recommendation model further includes: a training module, configured to train the AI recommendation model according to the sample when the input data is training data; and a prediction module, configured to predict the sample by using the AI recommendation model when the input data is data to be processed, to obtain a recommendation result.

An embodiment of this application provides an electronic device, including a memory and a processor, the memory storing computer-readable instructions, the computer-readable instructions, when executed by the processor, causing the processor to perform the foregoing feature processing method for an AI recommendation model.

An embodiment of this application provides a storage medium, storing computer-readable instructions, the computer-readable instructions, when executed by a processor, causing the processor to perform the feature processing method for an AI recommendation model provided in the embodiments of this application, for example, the feature processing method for an AI recommendation model shown in FIG. 4A and FIG. 4B.

In some embodiments, the storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disc, or a CD-ROM; or may be various devices including one of or any combination of the foregoing memories.

The term module, and other similar terms such as subunit, unit, submodule, etc., in this disclosure may refer to a software unit, a hardware unit, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each unit can be part of an overall module that includes the functionalities of the module.

In some embodiments, the computer-readable instructions can be written in the form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the computer-readable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In an example, the computer-readable instructions may be deployed to be executed on a computing device, or deployed to be executed on a plurality of computing devices at the same location, or deployed to be executed on a plurality of computing devices that are distributed in a plurality of locations and interconnected by using a communication network.

An embodiment of this application provides a computer program product or a computer program. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

The steps in the embodiments of this application are not necessarily performed according to a sequence indicated by step numbers. Unless explicitly specified in this application, the steps are performed without any strict sequence limitation, and may be performed in another sequence. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the another step.

In summary, the difference between the data structures of input data from different sources is overcome by using embodiments of this application, and uniform processing is performed on the input data by using the feature extraction function, thereby improving the flexibility and efficiency of feature extraction, ensuring the strong consistency between the features in the sample, and achieving a good sample generation effect for a large-scale sparse advertisement scenario or service recommendation scenario, where "large-scale" refers to a large quantity of features, and a scale may reach 100 million or more; and "sparse" means that each sample includes only some features of some feature groups, and the scale may be hundreds or thousands.

The foregoing descriptions are merely embodiments of this application and are not intended to limit the protection scope of this application. Any modification, equivalent replacement, or improvement made without departing from the spirit and range of this application shall fall within the protection scope of this application.

A person of ordinary skill in the art may understand that some or all procedures in the method in the foregoing embodiments may be implemented by a computer program instructing related hardware. The program may be stored in a non-volatile computer-readable storage medium, and when the program is executed, the procedures in the foregoing method embodiments may be implemented. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDR SDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

What is claimed is:

1. A feature processing method for an artificial intelligence (AI) recommendation model, performed by a server that communicatively configured with an electronic device and a database, the electronic device being configured to display a service application on a graphical interface, the method comprising:

obtaining, at the server, online data to be processed having an online data structure as input data, and converting a data structure of the input data into a uniform sample structure, the online data to be processed being generated on an electronic device in response to an operation performed via the service application, and sent by the electronic device to the server;

determining, by the server, a feature group identifier and a feature extraction function that correspond to the AI recommendation model;

obtaining, by the server, a feature group identifier, a feature identifier and a feature value of the input data by performing feature extraction on the converted input data according to the feature extraction function;

constructing, by the server, a sample of the AI recommendation model based on a result of the feature extraction according to a triplet structure of: the feature group identifier corresponding to the AI recommendation model, the feature identifier, and the feature value of the input data, wherein:

training data of the AI recommendation model includes offline training data having an offline data structure, the offline data structure being different from the online data structure, the training data is converted into the uniform sample structure to obtain converted training data for the AI recommendation model;

feature extraction is performed on the converted training data to obtain training samples, and each training sample is constructed with the same triplet structure of: the feature group identifier, the feature identifier, and the feature value;

during training, a parameter in the AI recommendation model is adjusted according to a difference between an output parameter of the AI recommendation model and a feature value in the triplet structure of the training sample, to reduce a difference between the output parameter and the feature value of the training sample for subsequent training of the AI recommendation model;

predicting, by the server, a recommendation result by using the AI recommendation model on the sample, and storing the recommendation result in the database; and sending, from the database by the server, the recommendation result to the electronic device, to display the recommendation result in the service application on the graphical interface.

2. The feature processing method according to claim 1, wherein the determining a feature group identifier and a feature extraction function that correspond to the AI recommendation model comprises:

obtaining atomic feature registration information and combined feature registration information, the atomic feature registration information comprising a registered atomic feature group identifier and a corresponding feature extraction function, and the combined feature registration information comprising a registered combined feature group identifier and at least two corresponding atomic feature group identifiers;

obtaining a feature group identifier set corresponding to the AI recommendation model, and traversing the feature group identifier set; and adding, when a traversed feature group identifier matches the atomic feature registration information, a feature extraction function corresponding to the feature group identifier of the atomic feature registration information to a feature extraction function chain.

3. The feature processing method according to claim 2, further comprising:
  determining, when a traversed feature group identifier does not match the atomic feature registration information but matches the combined feature registration information, a target atomic feature group identifier corresponding to the feature group identifier of the combined feature registration information;
  determining a target feature extraction function corresponding to the target atomic feature group identifier of the atomic feature registration information; and
  adding the target feature extraction function to the feature extraction function chain when the target feature extraction function does not exist in the feature extraction function chain.

4. The feature processing method according to claim 2, wherein obtaining a feature group identifier, a feature identifier and a feature value of the input data by performing feature extraction on the converted input data according to the feature extraction function comprises:
  traversing the feature extraction function chain; and
  obtaining an atomic feature group identifier, an atomic feature identifier and an atomic feature value of the input data by performing feature extraction on the converted input data according to a traversed feature extraction function.

5. The feature processing method according to claim 4, wherein the constructing a sample of the AI recommendation model according to the feature group identifier corresponding to the AI recommendation model and the feature group identifier, the feature identifier and the feature value of the input data comprises:
  traversing the feature group identifier set; and
  determining, when a traversed feature group identifier matches the atomic feature registration information, the feature group identifier as a first atomic feature group identifier to be added, and adding the first atomic feature group identifier, a corresponding atomic feature identifier and a corresponding atomic feature value to the sample.

6. The feature processing method according to claim 5, further comprising:
  determining, when a traversed feature group identifier does not match the atomic feature registration information but matches the combined feature registration information, the feature group identifier as a first combined feature group identifier to be added;
  determining at least two first atomic feature group identifiers to be added corresponding to the first combined feature group identifier of the combined feature registration information, and determining atomic feature identifiers and atomic feature values that correspond to the at least two first atomic feature group identifiers;
  obtaining a combined feature identifier by combining the atomic feature identifiers corresponding to the at least two first atomic feature group identifiers, and obtaining a combined feature value by combining the atomic feature values corresponding to the at least two first atomic feature group identifiers; and
  adding the first combined feature group identifier, the combined feature identifier and the combined feature value to the sample.

7. The feature processing method according to claim 6, wherein
  the obtaining the combined feature identifier by combining the atomic feature identifiers corresponding to the at least two first atomic feature group identifiers comprises:
  obtaining the combined feature identifier by performing a first combination operation on the atomic feature identifiers corresponding to the at least two first atomic feature group identifiers, the first combination operation comprising at least one of a hash operation, a bitwise OR operation, a bitwise AND operation, and a bitwise XOR operation; and
  the obtaining the combined feature identifier by combining the atomic feature values corresponding to the at least two first atomic feature group identifiers comprises:
  obtaining the combined feature identifier by performing a second combination operation on the atomic feature values corresponding to the at least two first atomic feature group identifiers, the second combination operation comprising at least one of a multiplication operation and an addition operation.

8. The feature processing method according to claim 1, further comprising:
  training the AI recommendation model according to the sample when the input data is training data; and
  obtaining a recommendation result by predicting the sample using the AI recommendation model when the input data is data to be predicted.

9. The feature processing method according to claim 8, wherein the training the AI recommendation model according to the sample comprises:
  creating a copy of the AI recommendation model; and
  training the copy of the AI recommendation model according to the sample.

10. The feature processing method according to claim 9, wherein
  before the training the copy of the AI recommendation model according to the sample, the method further comprises:
  determining a first accuracy rate of the copy of the AI recommendation model according to the sample; and
  after the training the copy of the AI recommendation model according to the sample, the method further comprises:
  determining a second accuracy rate of the trained copy of the AI recommendation model according to a sample corresponding to new training data; and
  updating the AI recommendation model according to the trained copy of the AI recommendation model when the second accuracy rate exceeds the first accuracy rate.

11. The feature processing method according to claim 10, wherein the updating the AI recommendation model according to the trained copy of the AI recommendation model comprises:
  obtaining a generation rate of the training data; and
  updating the AI recommendation model according to the trained copy of the AI recommendation model when the generation rate is less than a generation rate threshold.

12. The feature processing method according to claim 8, wherein before the training the AI recommendation model according to the sample, the method further comprises:
  obtaining a feature adjustment identifier and a corresponding adjustment value;
  determining, from the sample, each group of a feature group identifier, a feature identifier and a feature value that conform to the feature adjustment identifier as a first subsample to be adjusted; and updating a weight value of the first subsample to the adjustment value, the feature adjustment identifier being one of a feature group identifier, and a feature group identifier and a feature identifier.

13. A feature processing apparatus for an AI recommendation model, the apparatus being applied to a server communicatively configured with an electronic device and a database, the electronic device being configured to display a service application on a graphical interface, the apparatus comprising a memory and a processor, the memory storing computer-readable instructions, the computer-readable instructions, when executed by the processor, causing the processor to:

obtain online data to be processed having an online data structure as input data, and convert a data structure of the input data into a uniform sample structure, the online data to be processed being generated on the electronic device in response to an operation performed via the service application, and sent by the electronic device to the server;

determine a feature group identifier and a feature extraction function that correspond to the AI recommendation model;

obtain a feature group identifier, a feature identifier and a feature value of the input data by performing feature extraction on the converted input data according to the feature extraction function;

construct a sample of the AI recommendation model based on a result of the feature extraction according to a triplet structure of: the feature group identifier corresponding to the AI recommendation model, the feature identifier, and the feature value of the input data, wherein:

training data of the AI recommendation model includes offline training data having an offline data structure, the offline data structure being different from the online data structure, the training data is converted into the uniform sample structure to obtain converted training data for the AI recommendation model;

feature extraction is performed on the converted training data to obtain training samples, and each training sample is constructed with the same triplet structure of: the feature group identifier, the feature identifier, and the feature value;

during training, a parameter in the AI recommendation model is adjusted according to a difference between an output parameter of the AI recommendation model and a feature value in the triplet structure of the training sample, to reduce a difference between the output parameter and the feature value of the training sample for subsequent training of the AI recommendation model;

predict a recommendation result by using the AI recommendation model on the sample, and store the recommendation result in the database; and send the recommendation result to the electronic device via the database, to display the recommendation result in the service application on the graphical interface.

14. The feature processing apparatus according to claim 13, wherein the processor is further configured to:

obtain atomic feature registration information and combined feature registration information, the atomic feature registration information comprising a registered atomic feature group identifier and a corresponding feature extraction function, and the combined feature registration information comprising a registered combined feature group identifier and at least two corresponding atomic feature group identifiers;

obtain a feature group identifier set corresponding to the AI recommendation model, and traverse the feature group identifier set; and add, when a traversed feature group identifier matches the atomic feature registration information, a feature extraction function corresponding to the feature group identifier of the atomic feature registration information to a feature extraction function chain.

15. The feature processing apparatus according to claim 14, wherein the processor is further configured to:

determine, when a traversed feature group identifier does not match the atomic feature registration information but matches the combined feature registration information, a target atomic feature group identifier corresponding to the feature group identifier of the combined feature registration information;

determine a target feature extraction function corresponding to the target atomic feature group identifier of the atomic feature registration information; and add the target feature extraction function to the feature extraction function chain when the target feature extraction function does not exist in the feature extraction function chain.

16. The feature processing apparatus according to claim 13, wherein the processor is further configured to:

traverse the feature extraction function chain; and obtain an atomic feature group identifier, an atomic feature identifier and an atomic feature value of the input data by performing feature extraction on the converted input data according to a traversed feature extraction function.

17. The feature processing apparatus according to claim 16, wherein the processor is further configured to:

traverse the feature group identifier set; and determine, when a traversed feature group identifier matches the atomic feature registration information, the feature group identifier as a first atomic feature group identifier to be added, and add the first atomic feature group identifier, a corresponding atomic feature identifier and a corresponding atomic feature value to the sample.

18. The feature processing apparatus according to claim 17, wherein the processor is further configured to:

determine, when a traversed feature group identifier does not match the atomic feature registration information but matches the combined feature registration information, the feature group identifier as a first combined feature group identifier to be added;

determine at least two first atomic feature group identifiers to be added corresponding to the first combined feature group identifier of the combined feature registration information, and determine atomic feature identifiers and atomic feature values that correspond to the at least two first atomic feature group identifiers;

obtain a combined feature identifier by combining the atomic feature identifiers corresponding to the at least two first atomic feature group identifiers, and obtaining a combined feature value by combining the atomic feature values corresponding to the at least two first atomic feature group identifiers; and add the first combined feature group identifier, the combined feature identifier and the combined feature value to the sample.

19. A non-transitory computer readable storage media for an AI recommendation model storing computer-readable instructions, the computer-readable instructions, when executed by one or more processors of a server communicatively configured with an electronic device and a database, causing the one or more processors to perform:

obtaining online data to be processed having an online data structure as input data, and convert a data structure of the input data into a uniform sample structure, the online data to be processed being generated on the electronic device in response to an operation performed via the service application, and sent by the electronic device to the server;

determining a feature group identifier and a feature extraction function that correspond to the AI recommendation model;

extracting a feature group identifier, a feature identifier and a feature value of the input data from the converted input data according to the feature extraction function;

constructing a sample of the AI recommendation model based on a result of the feature extraction according to a triplet structure of: the feature group identifier corresponding to the AI recommendation model, the feature identifier, and the feature value of the input data, wherein:

training data of the AI recommendation model includes offline training data having an offline data structure, the offline data structure being different from the online data structure, the training data is converted into the uniform sample structure to obtain converted training data for the AI recommendation model;

feature extraction is performed on the converted training data to obtain training samples, and each training sample is constructed with the same triplet structure of: the feature group identifier, the feature identifier, and the feature value;

during training, a parameter in the AI recommendation model is adjusted according to a difference between an output parameter of the AI recommendation model and a feature value in the triplet structure of the training sample, to reduce a difference between the output parameter and the feature value of the training sample for subsequent training of the AI recommendation model;

predicting a recommendation result by using the AI recommendation model on the sample, storing the recommendation result in the database; and sending the recommendation result to the electronic device via the database, to display the recommendation result in a service application on a graphical interface configured in the electronic device.

20. The computer readable storage media according to claim 19, wherein the determining a feature group identifier and a feature extraction function that correspond to the AI recommendation model comprises:

obtaining atomic feature registration information and combined feature registration information, the atomic feature registration information comprising an atomic feature group identifier and a corresponding feature extraction function that have been registered, and the combined feature registration information comprising a combined feature group identifier and at least two corresponding atomic feature group identifiers that have been registered;

obtaining a feature group identifier set corresponding to the AI recommendation model, and traversing the feature group identifier set; and adding, when a feature group identifier being traversed matches the atomic feature registration information, a feature extraction function corresponding to the feature group identifier of the atomic feature registration information to a feature extraction function chain.

\* \* \* \* \*